United States Patent
Ryan (12)

(10) Patent No.: US 7,513,516 B2
(45) Date of Patent: Apr. 7, 2009

(54) SHOCK ISOLATION CRADLE

(75) Inventor: Jeff Ryan, Willow Spring, NC (US)

(73) Assignee: JRI Development Group, LLC, Mooresville, NC (US)

( * ) Notice: Subject to any disclaimer, the term of this patent is extended or adjusted under 35 U.S.C. 154(b) by 224 days.

(21) Appl. No.: 11/466,554

(22) Filed: Aug. 23, 2006

(65) Prior Publication Data
US 2007/0108712 A1 May 17, 2007

Related U.S. Application Data

(60) Provisional application No. 60/710,604, filed on Aug. 23, 2005.

(51) Int. Cl.
*B60G 9/00* (2006.01)
(52) U.S. Cl. ............... 280/124.109; 280/124.1; 248/183.3
(58) Field of Classification Search .......... 180/124, 180/41; 280/47.11, 124.1, 124.109; 248/183.3
See application file for complete search history.

(56) References Cited

U.S. PATENT DOCUMENTS

| | | | | |
|---|---|---|---|---|
| 1,940,798 A | * | 12/1933 | Hanna | 280/98 |
| 2,099,819 A | | 11/1937 | Mercier | |
| 2,142,173 A | * | 1/1939 | Broluska | 280/788 |
| 3,024,041 A | * | 3/1962 | Maruhn | 280/124.109 |
| 3,085,354 A | * | 4/1963 | Rasmussen et al. | 434/31 |
| 3,592,422 A | * | 7/1971 | Paine et al. | 248/589 |
| 3,638,502 A | | 2/1972 | Leavitt et al. | |
| 3,746,117 A | * | 7/1973 | Alred | 180/21 |
| 4,550,926 A | | 11/1985 | MacIsaac | |
| 4,645,320 A | | 2/1987 | Muelling et al. | |
| 4,752,791 A | | 6/1988 | Alfred | |
| 4,783,038 A | | 11/1988 | Gilbert et al. | |
| 5,074,582 A | | 12/1991 | Parsons | |
| 5,161,822 A | | 11/1992 | Lund | |
| 5,169,110 A | | 12/1992 | Snaith et al. | |
| 5,305,981 A | | 4/1994 | Cunningham et al. | |
| 5,310,200 A | * | 5/1994 | MacIsaac | 280/5.506 |
| 5,335,856 A | * | 8/1994 | Nathan | 239/164 |
| 5,370,352 A | | 12/1994 | Platus | |
| 5,447,332 A | | 9/1995 | Heyring | |
| 5,480,188 A | | 1/1996 | Heyring | |
| 5,529,324 A | | 6/1996 | Krawczyk et al. | |
| 5,549,270 A | | 8/1996 | Platus et al. | |
| 5,577,790 A | | 11/1996 | Buell | |
| 5,836,647 A | | 11/1998 | Turman | |
| 5,957,427 A | | 9/1999 | Hanson | |
| 5,995,758 A | | 11/1999 | Tyler | |
| 6,007,078 A | | 12/1999 | Gottschalk et al. | |

(Continued)

FOREIGN PATENT DOCUMENTS

WO        02088585 A2    11/2002

(Continued)

*Primary Examiner*—Paul N Dickson
*Assistant Examiner*—Patrick Centolanzi
(74) *Attorney, Agent, or Firm*—Hammer & Associates, P.C.

(57) ABSTRACT

Methods and apparatus for supporting a payload within a vehicle, especially a land vehicle. In some embodiments, the apparatus includes a cradle that permits the payload to translate fore and aft during sudden decelerations of the vehicle, such as when an off road vehicle runs into an obstacle. Preferably, the payload motion is damped by dampeners that couple the payload to the vehicle.

14 Claims, 11 Drawing Sheets

U.S. PATENT DOCUMENTS

| | | | |
|---|---|---|---|
| 6,022,005 A | 2/2000 | Gran et al. | |
| 6,059,253 A | 5/2000 | Koutsky et al. | |
| 6,099,039 A | 8/2000 | Hine | |
| 6,164,665 A | 12/2000 | Lentz et al. | |
| 6,217,047 B1 | 4/2001 | Heyring et al. | |
| 6,250,678 B1 | 6/2001 | Yoshinaka et al. | |
| 6,263,160 B1 | 7/2001 | Lewis | |
| 6,354,556 B1 | 3/2002 | Ritchie et al. | |
| 6,396,235 B1 * | 5/2002 | Ellington et al. | 318/649 |
| 6,422,546 B1 | 7/2002 | Nemoto et al. | |
| 6,547,205 B2 | 4/2003 | Carter et al. | 248/560 |
| 6,702,265 B1 | 3/2004 | Zapletal | |
| 7,055,839 B2 * | 6/2006 | Leitner | 280/166 |
| 7,212,736 B2 * | 5/2007 | Nelson et al. | 392/412 |
| 7,273,201 B2 * | 9/2007 | Lindsay | 248/371 |
| 7,296,778 B2 * | 11/2007 | Lindsay | 248/648 |
| 7,437,224 B2 * | 10/2008 | Tsao et al. | 701/13 |
| 7,445,399 B2 * | 11/2008 | Dunn et al. | 403/150 |
| 2005/0133288 A1 | 6/2005 | Lin | |
| 2005/0257972 A1 | 11/2005 | Iwami et al. | |
| 2006/0065454 A1 | 3/2006 | Oshima et al. | |
| 2006/0120841 A1 | 6/2006 | Meeks | |
| 2006/0131092 A1 | 6/2006 | Tsujii et al. | |
| 2006/0139840 A1 | 6/2006 | Yasuda et al. | |
| 2006/0211543 A1 * | 9/2006 | Feldman et al. | 482/57 |
| 2008/0210025 A1 * | 9/2008 | Goossen et al. | 74/5.34 |

FOREIGN PATENT DOCUMENTS

| | | |
|---|---|---|
| WO | 03066406 A1 | 8/2003 |
| WO | 2004074027 A1 | 9/2004 |
| WO | 2005030508 A1 | 4/2005 |
| WO | 2005051712 A2 | 6/2005 |
| WO | 2006072077 A2 | 7/2006 |

* cited by examiner

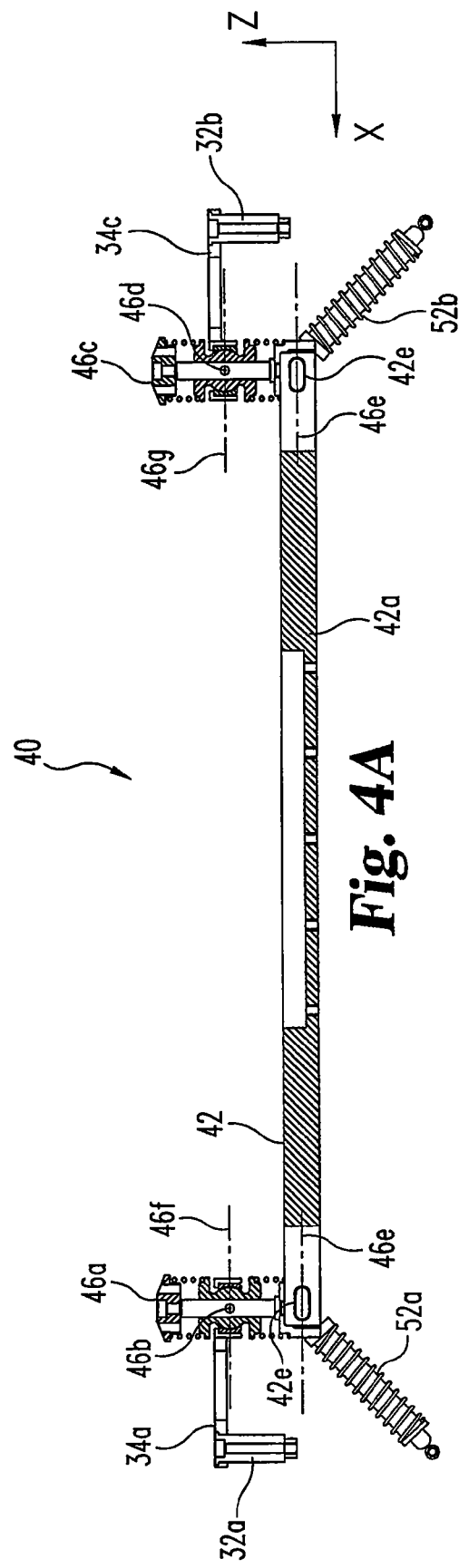

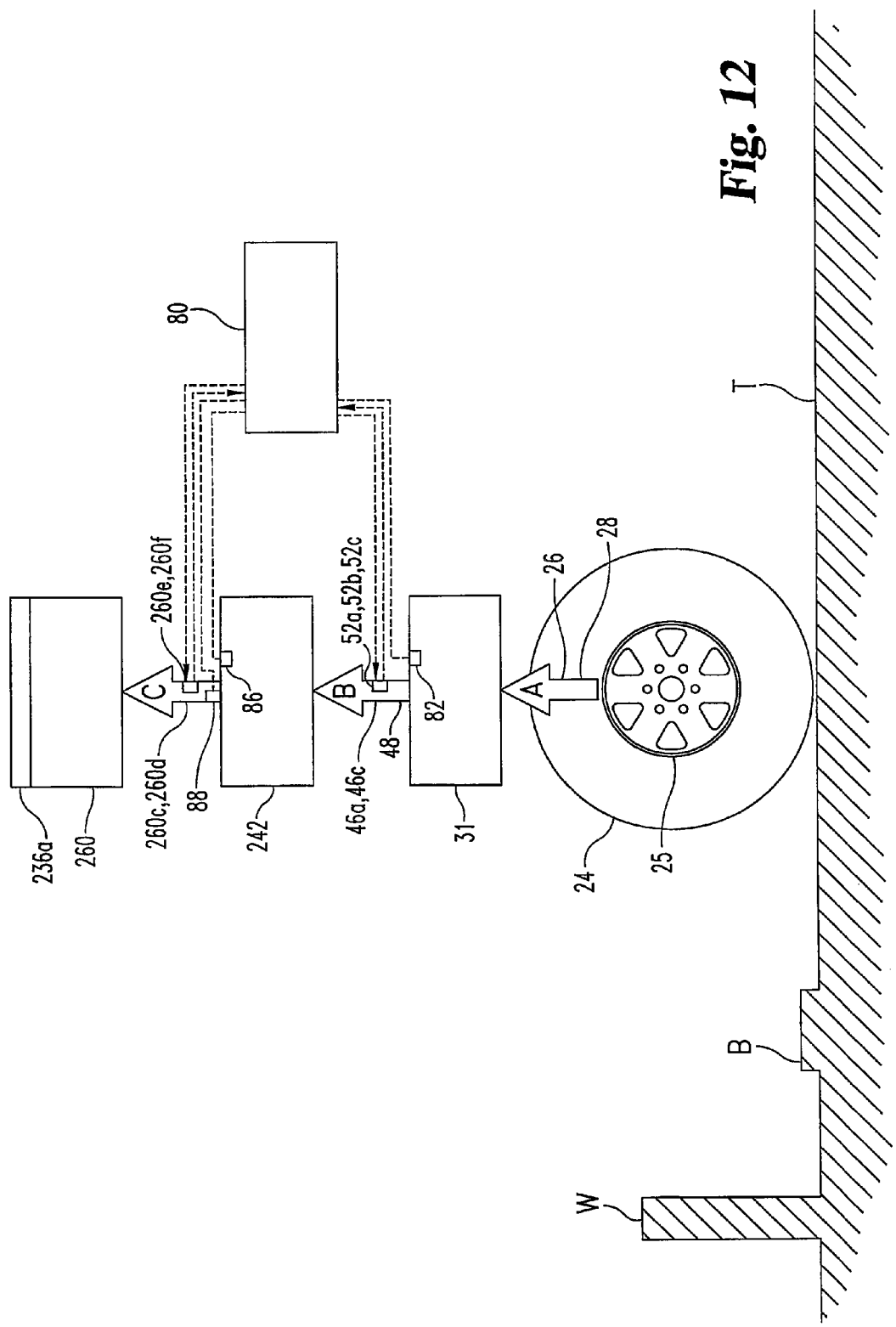

SHOCK ISOLATION CRADLE

CROSS REFERENCE TO RELATED APPLICATIONS

This application claims priority to U.S. Provisional Patent Application Ser. No. 60/710,604, filed Aug. 23, 2005, which is incorporated herein by reference.

FIELD OF THE INVENTION

The present invention pertains to methods and apparatus for isolating a payload from a low frequency, high amplitude movement, and in particular for isolating sensitive electronics or a driver from the effects of vehicle collisions.

BACKGROUND OF THE INVENTION

There are increasing applications for robotically controlled vehicles, especially robotically controlled ground vehicles that are adapted and configured to traverse unprepared terrain. Some robotic, all-terrain vehicles are used in military applications. These vehicles may be required to carry supplies, sensors, weapons, or injured soldiers. There are also analogous non-military uses for such vehicles, including transportation of supplies during wilderness trips, remote surveillance by law enforcement officials, and transportation of injured people.

Unfortunately, the algorithms for controlling the path of a vehicle over unprepared terrain sometimes produce unexpected results. Even though the vehicle controller may have information from a variety of spatial sensors (including visual, infrared, acoustic, and radar signals, and GPS information in combination with stored terrain maps). The sensors may not detect some obstacles, the computer may not properly interpret the sensor information, or the path of the vehicle may change suddenly in time (such as from falling boulders or shock waves from nearby explosions). In such cases, the vehicle may be impacted in such a way that low frequency, high amplitude G levels are encountered. One example would be a vehicle running into a wall.

These low frequency, high G impacts can have a severe effect on the payload of the vehicle. As one example, the vehicle can include a controller, such as a computer. The computer may fail mechanically because it is inadequately designed for the low frequency, high amplitude environment. Often, such controllers are vibration tested, typically at frequencies of 20 hertz and above; or shock tested, such as with half sine waveforms; or exposed to static G levels, such as in a centrifuge but these various testing methods and environment may be inadequate to simulate a vehicle hitting a wall. If the controller's qualification testing was inadequate for this environment, then failures will likely result.

What is needed are methods and apparatus for managing the environment of a critical payload being exposed to a low frequency, high G environment. The present invention does this in novel and unobvious ways.

SUMMARY OF THE INVENTION

Some aspects of various embodiments of the inventions described or claimed herein relate to the cradling of a payload within a vehicle to reduce the exposure of the payload to sudden acceleration of the vehicle.

Yet other aspects of various embodiments of the inventions described or claimed herein relate to the support of a payload such that the payload is provided with sway-space within the vehicle in which the payload can be more slowly accelerated than the vehicle itself.

These and other aspects of the various embodiments of the invention will be apparent from the claims, drawings, and description to follow.

DESCRIPTION OF THE DRAWINGS

FIG. 4A is a cross sectional view of the apparatus of FIG. 3 as taken along line 4A-4A of FIG. 3.

FIG. 12 is a schematic representation of the dynamic interconnection of various components to each other and also the interconnection of various sensors and actuators to an electronic controller.

DESCRIPTION OF THE PREFERRED EMBODIMENT

Figure 1:
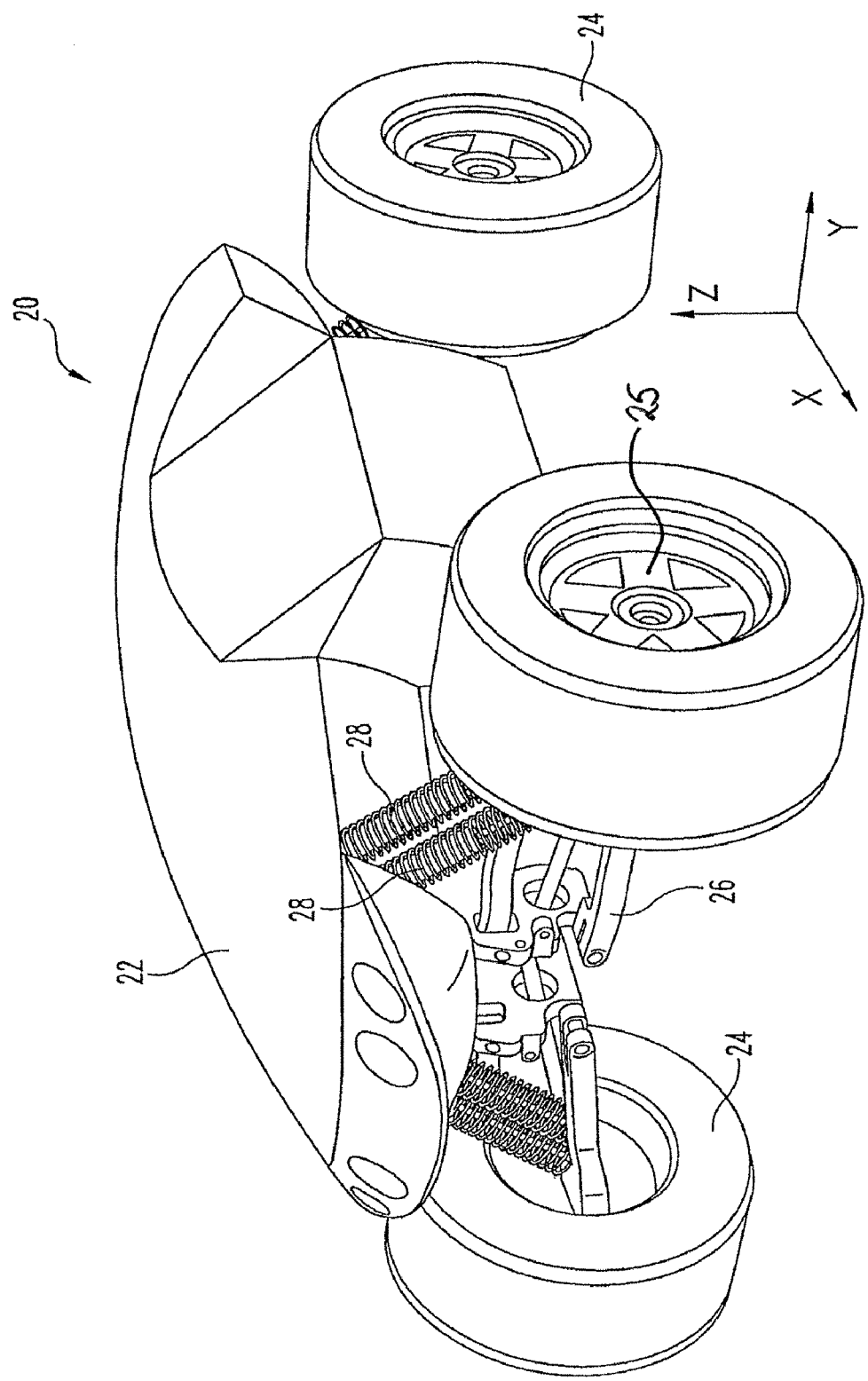
FIG. 1 is a front, top, left side perspective view of a vehicle according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

As used herein, the directions X, Y, and Z refer to fore and aft (longitudinal), right and left (lateral), and up and down (vertical) direction, respectively, for a conventional right-hand, orthogonal, Cartesian coordinate system, as best seen in FIG. 1. The terms roll, pitch, and yaw refer to rotations about the X, Y, and Z axes, respectively. Additionally, the use of an N-prefix in front of an element number (NXX) refers to an element that is the same as the non-prefixed element number (XX), except for the changes shown and described.

In one embodiment, the present invention pertains to a method and apparatus for modifying the acceleration load into the payload of a vehicle which is being exposed to a low frequency shock input. As one example, the apparatus includes a cradle that is pivotally supported by front and rear pivot joints. In one embodiment, each pivot joint is a ball and socket joint which permits rotational movement of the ball relative to the socket in three directions; although in some embodiments the particular design of the cradle and attachment structure may limit movement in one or two directions. In yet other embodiments, each pivot joint permits two degrees of relative rotational movement (such as a universal joint), such as for roll and pitch. In yet other embodiments, each pivot joint permits relative rotational movement in only a single direction, such as either roll or pitch.

In yet other embodiments, the payload is suspended by a cradle which is adapted and configured to place the center of gravity of the payload lower than the roll or pitch axes of the front and rear cradle support joints, such that any movement of the payload center of gravity (C.G.) from the centerline of the pivot joints produces a restoring moment which tends to realign the payload C.G. relative to the rotational axes.

In yet other embodiments, there is a cradle within a vehicle which is pivotally supported from the vehicle chassis at the front and the rear by central pivot joints. Each of the central pivot joints is captured between top and bottom biasing units, such as top and bottom springs. In one embodiment, each spring is preloaded so that the cradle attachment is approximately centered about the corresponding pivot joint. Preferably, the preload of the bottom spring is greater than the corresponding supported portion of the cradle and payload static weight.

In yet another embodiment of the present invention, a cradle is suspended by a plurality of pivot joints from a vehicle chassis. The cradle is further pivotally coupled to the chassis by a plurality of dampening units which utilize a magnetorheological (MR) fluid. Each dampening assembly is operably connected to an electronic controller which can apply a voltage to the fluid in order to modify the dampening characteristics of the damper by modifying the properties of the MR fluid. The electronic controller is preferably a computer which operates a software algorithm to isolate the payload from low frequency, high amplitude movements. In one embodiment, the controller senses rapid deceleration of the vehicle (such as when hitting an object) and applies a controlled voltage to one or more of the MR dampers in order to lessen the G-amplitude into the payload, sometimes with a corresponding lengthening of the time duration of the event.

In yet another embodiment of the present invention, a vehicle chassis is pivotally connected to a first cradle, and a second cradle is pivotally connected to the first cradle. The second cradle is pivotally attached to the first cradle and is pivotal about an axis generally parallel to the vehicle pitch axis. In yet other embodiments, a dampening unit is pivotally coupled at one end to the second cradle and pivotally coupled at the other end to the first cradle.

Yet another embodiment of the present invention includes a cradle placed within a vehicle and supported at each end by a central pivot joint. One attachment of the cradle to the central pivot joint (either the front or the rear) is by a substantially close-fitting bushing. The other pivotal connection of the cradle (at the other of the front or rear) is by means of a longitudinally oriented slot which permits limited relative movement of the cradle relative to the corresponding central pivot joint in a direction generally parallel to the longitudinal axis of the vehicle. This arrangement of a pivot within a longitudinally-oriented slot permits the front and rear central pivot joints, which are attached to the frame, to move longitudinally relative to each other without putting the cradle in a load path attempting to maintain their relative positions.

Figure 2:
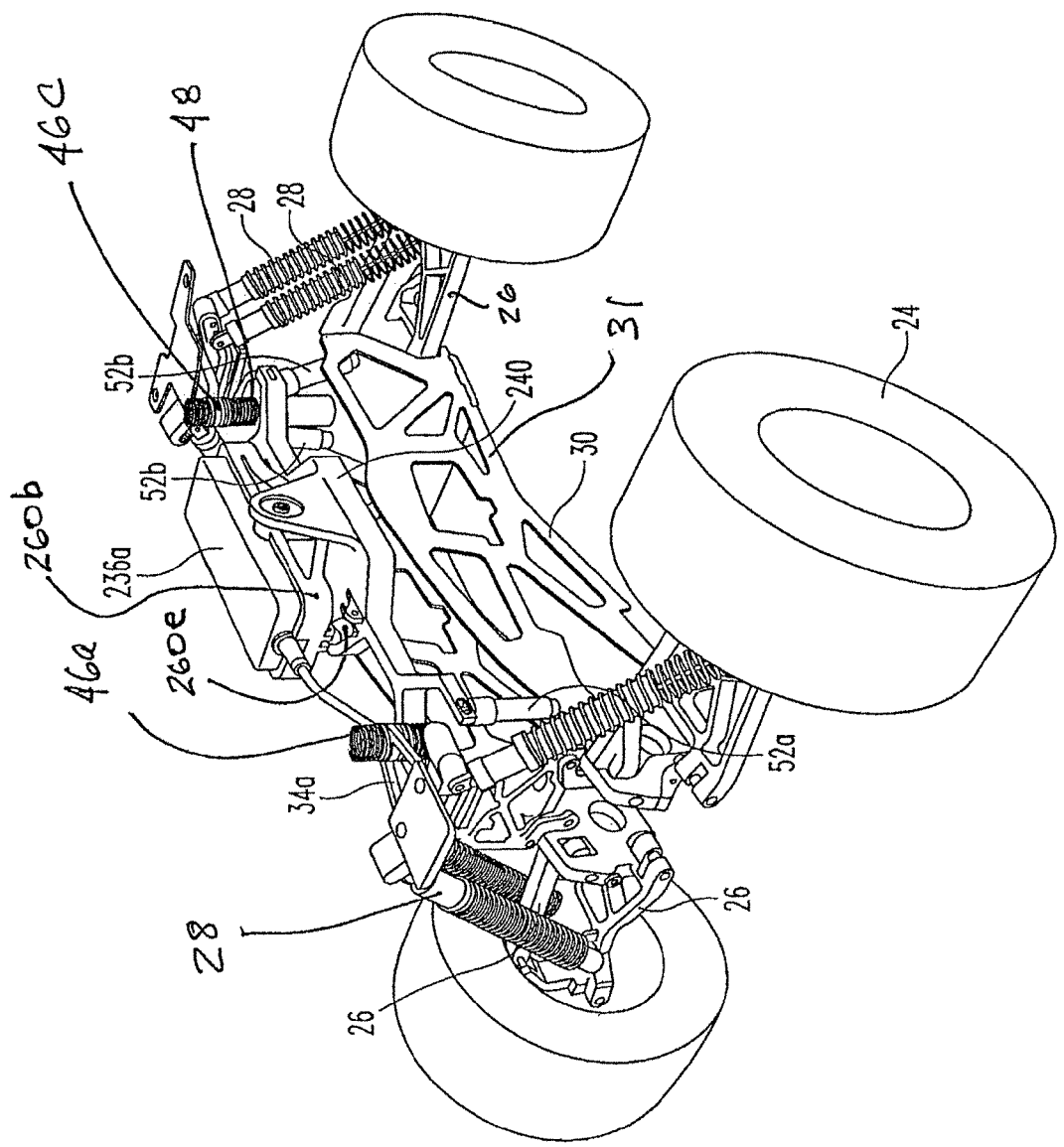
FIG. 2 is a perspective view of the vehicle of FIG. 1 with the body removed.
Figure 3:
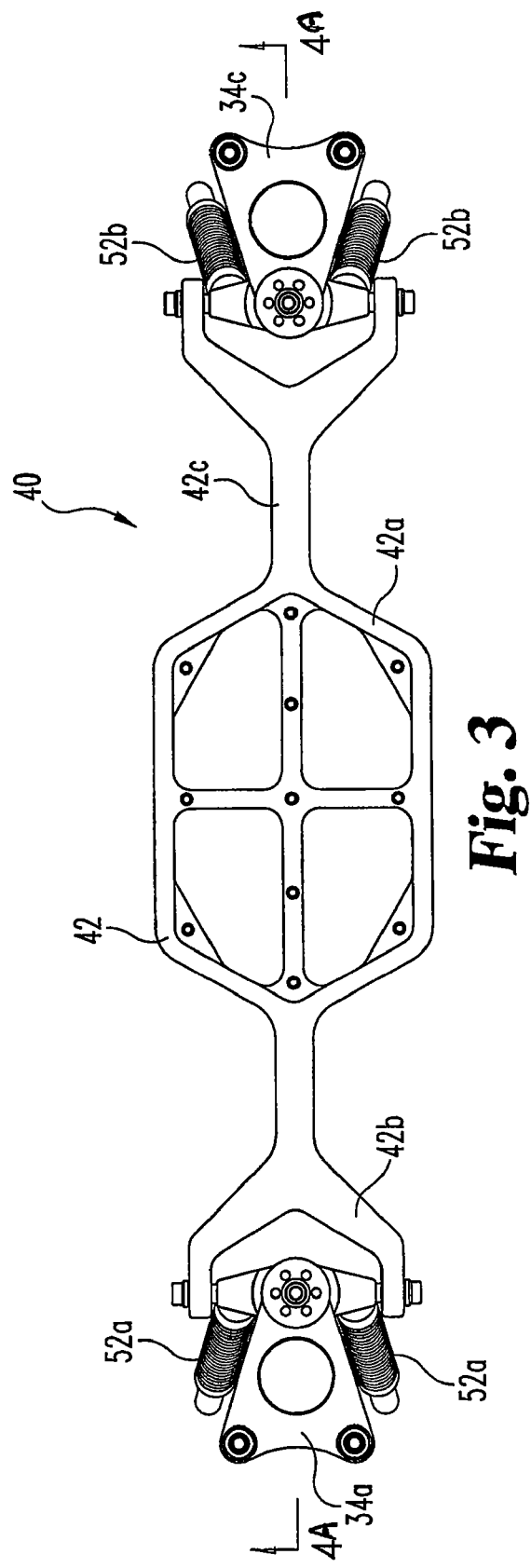
FIG. 3 is a top plan view of a cradling assembly according to one embodiment of the present invention.

FIGS. 1 and 2 are perspective views of a vehicle 20 according to one embodiment of the present invention. Vehicle 20 includes a body 22 mounted to a chassis 30. A plurality of tires 24 and corresponding wheels 25 provide cushioned support for body 22 and chassis 30 by a plurality of suspension arms 26 and spring/shock dampers 28. In one specific embodiment, each tire 24 is supported on a wheel that is pivotally attached to upper and lower suspension control arms 26 to chassis 30. Further, each wheel is biased from the chassis by a pair of spring/damper units 28. Further, the suspension control arms 26, spring/damper units 28, and the chassis 30 can be adapted and configured to permit large vertical movements of a suspended tire as the vehicle crosses natural terrain. In yet other embodiments, the vehicle 20 is robotically controlled by an operator that is not riding in the vehicle. The vehicle described and depicted in FIGS. 1 and 2 is an adaptation of an all-terrain vehicle. In such vehicles the tires 24 are sometimes relatively soft due to low tire inflation pressures, or as run-flat tires.

In one embodiment, vehicle 20 is a robotic all-terrain vehicle with the following measurements and capacities:

| | |
|---|---|
| DISPLACEMENT | 641 cc |
| ENGINE TYPE | SOHC 4-stroke 4-valve |
| COOLING SYSTEM | Liquid w/fan |
| TRANSMISSION | Automatic CVT with engine braking system |
| DRIVE SYSTEM | 2/4 WD + Diff Lock |
| OVERAL WIDTH | 47.5" |
| OVERALL HEIGHT | 49.3" |
| OVERAL LENGTH | 84.8" |
| WHEEL BASE | 50.0" |
| SUSPENSION TRAVEL FRONT | 10.0" |
| SUSPENSION TRAVEL REAR | 10.0" |
| GROUND CLEARANCE | 12.0" |
| SUSPENSION TYPE - FRONT | Double A-Arm |
| SUSPENSION TYPE - REAR | Fully Independent Suspension |
| BRAKE FRONT | Hydraulic Disc |
| BRAKE REAR | Hydraulic Disc |
| TIRE FRONT | 25 × 8-12 |
| TIRE REAR | 25 × 11-12 |
| MAX FUEL CAPACITY | 6.5 Gallons/24.6 Liters |
| RACK CAPACITY - FRONT | 100 lbs. |
| RACK CAPACITY - REAR | 200 lbs. |
| TOWING CAPACITY | 1050 lbs. |
| ALTERNATOR CAPACITY | 25 Amps |
| SPEEDOMETER | Digital |
| ODOMETER | Digital |
| DRY WEIGHT (LBS) | 699 |

Some features of vehicle 20 include: compact, all-aluminum body frame; carbon fiber and KEVLAR® (light, strong para-aramid synthetic fiber) body; sleek, low-profile body with low CG; heavy-duty independent front and rear suspension; high-ground clearance suspension geometry; run-flat all-terrain tires; lightweight; comparable size to a full-size ATV or small automobile; and turn-key, plug and go capability. Although specific measurements, capacities, and dimensions have been described, the present invention is not so limited, and this data is provided as an example only.

Although a robotic, all-terrain vehicle has been shown and described; the present invention also contemplates those embodiments in which the vehicle 20 is any kind of vehicle in which it is desired to manage any low frequency movement (including both low amplitude and high amplitude) into a payload of the vehicle. As examples, the present invention contemplates usage on automobiles, trucks, buses, ships and boats (including small, high speed military boats), fixed wing aircraft, and rotary wing aircraft. Further, although what has been shown and described is a robotic vehicle, the present invention also contemplates those embodiments in which the payload being supported is the vehicle operator, a weapons officer, or an injured person. Some embodiments of the present invention support a person in a "cocoon"-type structure or shell that is suspended within the vehicle. This operator enclosure completely surrounds the person and in some embodiments provides sealed protection against chemical and biological agents. Yet other enclosures provide armor protection from explosives and gunfire, especially to the bottom and sides of the person, such as by addition of KEV-LAR® (light, strong para-aramid synthetic fiber), or ceramic armor. The enclosure preferably includes one or more windows to the top and sides of the person to provide visibility during operation of the vehicle.

FIG. 2 is a view of vehicle 20 with body 22 and other components removed for clarity of viewing. As one example, the power train of vehicle 20 is not shown. The present invention contemplates any type of motive operation including an internal combustion engine driving two or four wheels, hydraulic motors driving one or more wheels, electric motors driving one or more wheels, and combinations of these power trains in hybrid operation.

A chassis 30 includes a frame 31 which interconnects the wheel suspension units 26. In one embodiment, vehicle 20 is adapted and configured to incur large tire deflections and large suspension movements when encountering obstacles and uneven terrain. However, the present invention is not so limited, and also contemplates those embodiments in which the tires and suspension are adapted and configured for modest deflection (such as passenger cars) and also those vehicles having solid axles and substantially rigid suspensions.

FIG. 2 includes a cradling assembly 240 centrally supported generally about the vehicle longitudinal axis by front and rear central pivot joints 46a and 46c, respectively. Cradling assembly 240 includes a main cradle 242 pivotally coupled to central pivot joints 46a and 46c, and a secondary cradle 260 pivotally supported by main cradle 242. A payload 236a such as an electronic controller is attached to secondary cradle 260.

Figure 4B:
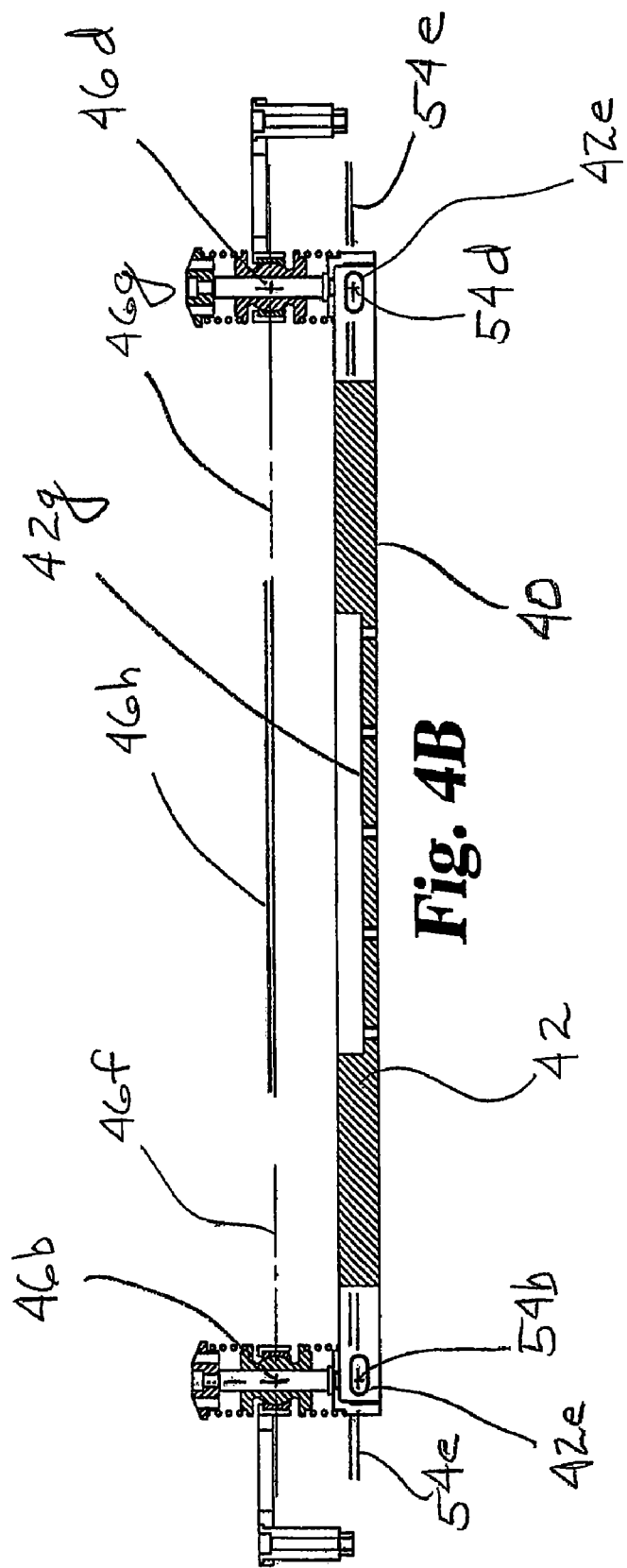
FIG. 4B is a cross sectional view of the apparatus of FIG. 3 as taken along line 4A-4A of FIG. 3.
Figure 5:
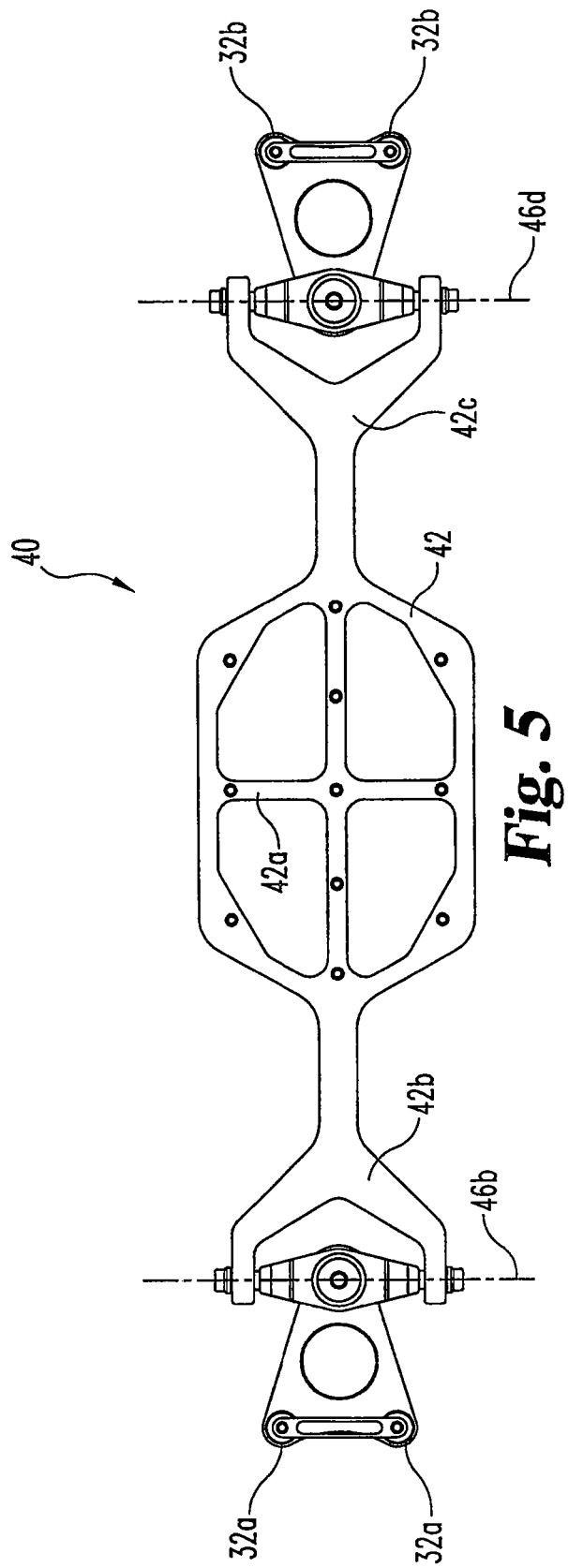
FIG. 5 is a bottom view of the apparatus of FIG. 3.
Figure 6:
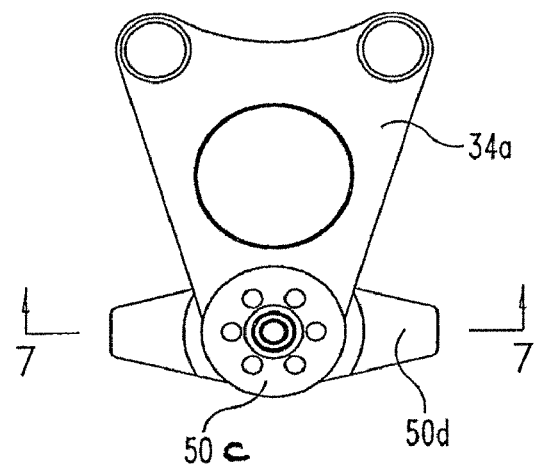
FIG. 6 is a top plan view of a portion of the apparatus of FIG. 3.

FIGS. 3, 4A, 4B, and 5 show various views of a cradling assembly 40 which is substantially similar to cradling assembly 240, except lacking the pivotal attachment of a secondary cradle 260. Cradling assembly 40 includes a main cradle 42 which is pivotally coupled to bracket 34a of chassis 30 by a front, central pivot joint 46a, and to a rear bracket 34c of chassis 30 by a rear central pivot joint 46c. As best seen in FIGS. 5 and 6, front bracket 34a is rigidly attached to frame 31 by a pair of front posts 32a. Rear bracket 34c is rigidly attached to frame 31 by a pair of rear posts 32b.

Main cradle 42 includes a payload section 42a which is located between a front yoke 42b and a rear yoke 42c. In one embodiment, cradle 42 is symmetric about the longitudinal axis of the vehicle, and the front and rear central pivot joints 46a and 46c, respectively, are also arranged along the vehicle longitudinal axis. However, other embodiments of the present invention contemplate asymmetric cradles, as well as front and rear pivot connections to the chassis that are not aligned in a plane containing the vehicle longitudinal axis.

Referring to FIG. 4B, cradling assembly 40 includes a main cradle 42 having a payload support surface 42g that is located below pitch axes 46b and 46d and roll axes 46f and 46g. Preferably, support surface 42g is located sufficiently below roll axes 46f and 46g such that the center of gravity of the combination of the payload and cradle 42 remains below the plane 46h (identified with double lines) which contains both roll axes 46f and 46g. In the embodiment shown in FIG. 3, roll axes 46f and 46g are co-linear. However, the present invention also contemplates those embodiments in which these roll axes are not co-linear but are co-planar. FIG. 4B also shows that the pitch axes 46b and 46d of the central pivot joints 46a and 46c, respectively, also lie within plane 46h. For those embodiments of the present invention utilizing ball and socket joints for the front and rear central pivot joints, the pitch and roll axes intersect each other and also intersect the center of the ball. However, the present invention also contemplates those embodiments in which the pitch and roll axes are displaced from one another, especially in the X or Z directions, by a system of pivotal linkages.

FIG. 4B also shows that the front and rear pitch axes 54b and 54d, respectively, of the cradle 42 lie within plane 54e (indicated by double lines). It can be seen that in one embodiment of the present invention, cradling assembly 40 can move fore and aft in motion suggestive of a 4-bar parallelogram linkage. In this 4-bar linkage, the two long links are cradle 42 (from pivot axis 54b to pivot axis 54d) and chassis 31 (from pivot axis 46b to pivot axis 46d, which distance is established by frame 31). The two short links are rod 50a of front central pivot joint 46a (from pitch axis 46b to pitch axis 54b), and the corresponding rod from the rear central pivot joint 46c (from pitch axis 46d to pitch axis 54d). Further, main cradle 42 as drawn in FIG. 4B includes slotted pivot attachments 42e at both the front and rear.

Payload section 42a is adapted and configured for attachment of a payload 236a. In one embodiment, payload 236a comprises one or more electronic units such as a vehicle controller, a sensor and/or its corresponding electronics, or a weapons controller. In yet other embodiments, payload 236a comprises a seat for an occupant or a cot for an injured passenger. Some embodiments include a main cradle having an enclosure or shell which surrounds a person within the vehicle. The enclosure is suspended inside the vehicle as described herein for other cradles. Cradling assembly 40 provides less exposure to low frequency, high amplitude accelerations for the payload.

In one embodiment, vehicle 20 includes a pair of front cradle dampers 52a which are pivotally connected on one end to frame 31, and which are pivotally connected on the other end to lower arm 50d of the front central pivot joint 46a. A pair of rear cradle dampers 52b are each pivotally connected at one end to frame 31 and to the frame of chassis 30 and at the other end to the lower arm of the rear central pivot joint 46c. In yet other embodiments, the main cradle 42 is also pivotally coupled on right and left sides to right and left central cradle dampers 52c, which are likewise pivotally connected at their other ends to frame 31 of chassis 30. Cradling assembly 40 is thus suspended from a frame of a vehicle, and in turn the frame of the vehicle is suspended from the wheels of the vehicle, and the wheels in turn are supported from the terrain by the tires. Each of the suspension connections thus described (from terrain to the wheel; from the wheel to the frame; from the frame to the cradling assembly 40) permits rigid body motion of the suspended item with multiple degrees of freedom.

Figure 7:
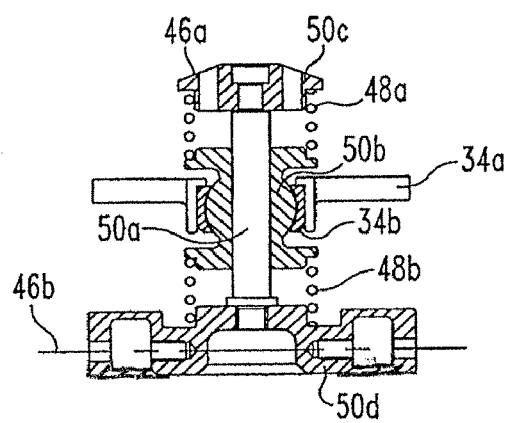
FIG. 7 is a cross sectional view of the apparatus of FIG. 6 as taken along lines 7-7 of FIG. 6.
Figure 8:
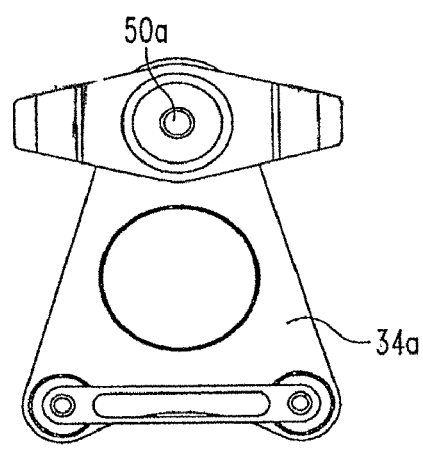
FIG. 8 is a bottom plan view of the apparatus of FIG. 6.

FIGS. 6, 7 and 8 show various views of the front central attachment of cradling assembly 40. Cradling assembly 40 provides for the pivotal, multiple degree of freedom suspension of a main cradle 42 from vehicle frame 31. The following description also applies to the rear central attachment of cradling assembly 40, except for the slotted pivotal attachment which will be discussed later.

Front chassis bracket 34a captures within it a pocket or socket 34b. A spherical ball 50b is constrained by socket 34b such that ball 50b and accompanying upper and lower spring guides are rotatable about socket 34b in three axes. However, the present invention also contemplates those embodiments in which ball and socket joint 50b and 34b, respectively, are replaced with a universal-type joint which permits rotation about roll and pitch directions, and further includes those embodiments which permit only a single degree of rotational freedom about a pitch axis.

In some embodiments of the present invention, the three degrees of freedom permitted by ball and socket joint 50b and 34b are constrained by the attached mechanisms to two degrees of freedom. For example, the connection of cradle 40 at each end to ball and socket joints effectively eliminates the ability of cradle 40 to rotate in yaw. Even so, the use of a ball and socket joint is preferred in some embodiments, because the joints do not permit bending of frame 31 to impart a Z axis moment into the suspended cradle. In addition, the use of multiple degree of freedom central pivot joints can also minimize moments that would otherwise be imparted by frame flexure about the X and the Y axes.

Referring to FIG. 7, a rod 50a is slidably guided within a cylindrical hole through ball 50b. Rod 50a is securely fastened at the top to a cap 50c, and at the bottom to a lower arm 50d. Cap 50c and lower arm 50d establish lower and upper extreme limits, respectively, on vertical travel of rod 50a relative to ball 50b. The present invention also contemplates those embodiments in which lower arm 50d is a rigid extension of ball 50b, such that the lower arm cannot be vertically displaced relative to the ball and socket joint.

Still referring to FIG. 7, central pivot joint 46a includes upper and lower centering springs 48a and 48b, respectively. Upper spring 48a is captured between the upper spring guide of ball 50b and the corresponding spring guide of cap 50c. Lower front spring 48b is captured between a spring guide of ball 50b and an opposing spring guide of lower arm 50d. In a preferred embodiment, each spring 48a and 48b is preloaded when assembled into front central pivot joint 46a so that the rigid connection of cap 50c, rod 50a, and lower arm 50d is suspended at a point intermediate of the upper and lower travel limits of the assembly. As one example, upper spring 48a is preloaded to a spring force that is greater than the portion of weight of cradling assembly 40 which would otherwise be statically supported. Further, a portion of the preload of upper spring 48a balances the preload of bottom spring 48b.

Lower arm 50d further includes means for pivotally attaching arm 50d to the front yoke 42b of main cradle 42. In one embodiment, the pivotal connection of yoke 42b to arm 50d is a simple, single degree of freedom pivot joint, which can be accomplished with any type of bearing, including plain, ball, roller, and tapered roller as examples. The connection of the rear central pivot joint 46c to main cradle 42 is substantially the same as described above for the front central pivot joint 46a, except that rear yoke 42c includes a slotted hole which permits pivoting as well as limited fore and aft movement of rear yoke 42c relative to the rear lower arm of pivot joint 46c (referring to FIG. 4A). If frame 31 flexes in any manner such that the distance between the cradle central attachment point decreases, the slotted hole of rear yoke 42c permits a simple sliding of the pivot joint relative to the cradle, such that the cradle is not longitudinally loaded by the cradle central attachments. Further, the use of a slotted hole also accommodates any longitudinal differential thermal growth of frame 31 relative to cradle 42.

Figure 9:
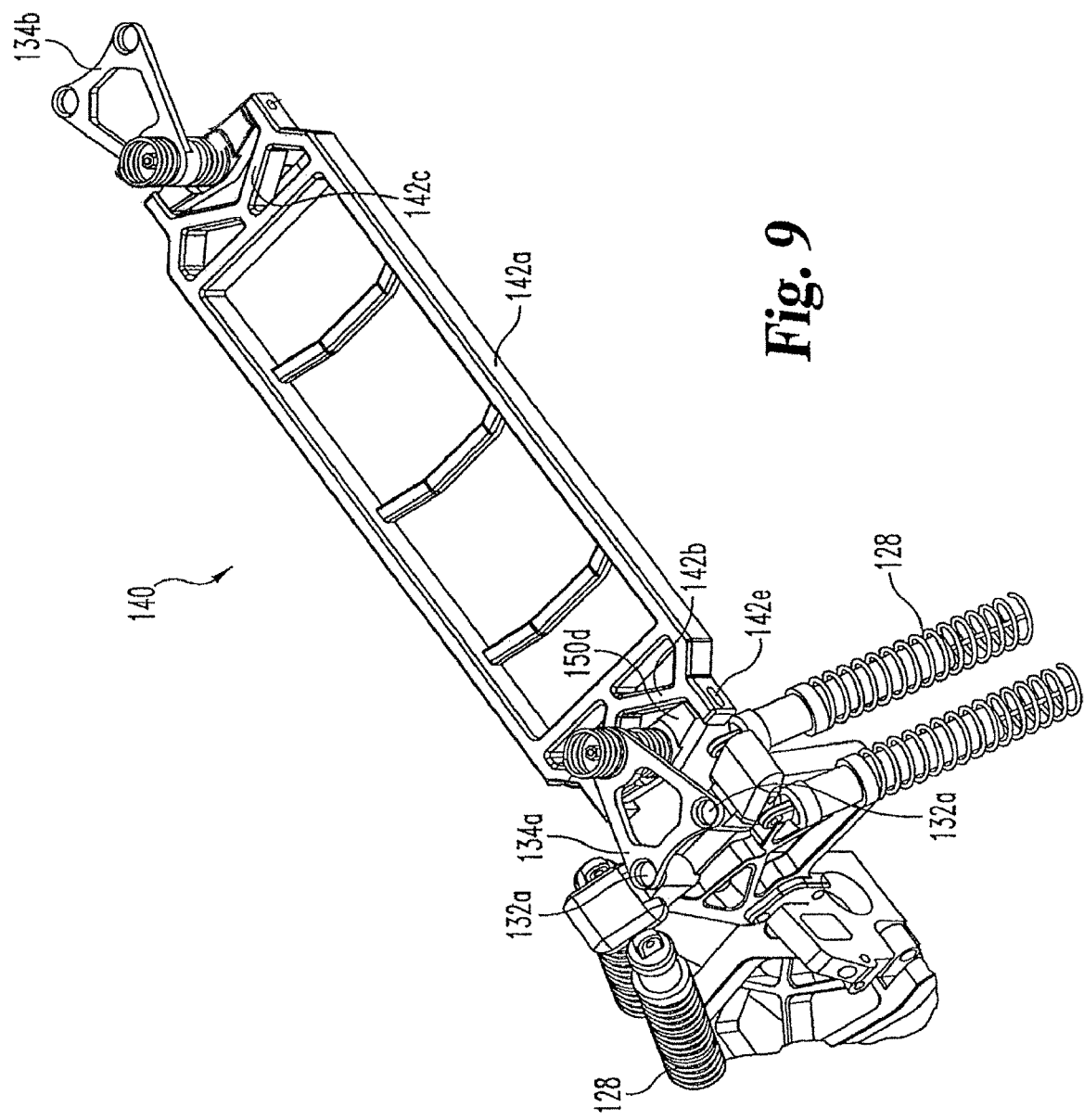
FIG. 9 is top, front, left side perspective view of a cradling assembly according to another embodiment of the present invention.

FIG. 9 shows a cradling assembly 140 according to another embodiment of the present invention. Cradling assembly 140 includes a main cradle 142 having a payload section 142a which is substantially of a ladder-type configuration. Front and rear yokes 142b and 142c are integrated into the longitudinal side rails of payload section 142a.

Front yoke 142b includes a lower arm 150 that has a front lower arm 150d that includes a longitudinally-oriented slot 142e for pivotal connection of yoke 142b to lower arm 150d. Preferably, the pivotal connection of rear yoke 142c to the rear lower arm is by way of a pivot connection to a circular hole. However, the present invention also includes embodiments in which both the front and rear lower arms are pivotally connected to the front and rear yokes, respectively, by slotted holes.

FIG. 9 also shows the connection of the four front suspension dampers 128 to chassis 30. A pair of left side suspension dampers 128 are pivotally connected to the fore and aft sides of an ear which extends from post 132a. In one embodiment, the other pairs of suspension dampers 128 are likewise pivotally connected to members extending from the front and rear posts. However, the present invention is not so limited, and also contemplates those embodiments in which the suspension dampers are attached more remotely from fore and aft brackets 134a and 134b.

Figure 10:
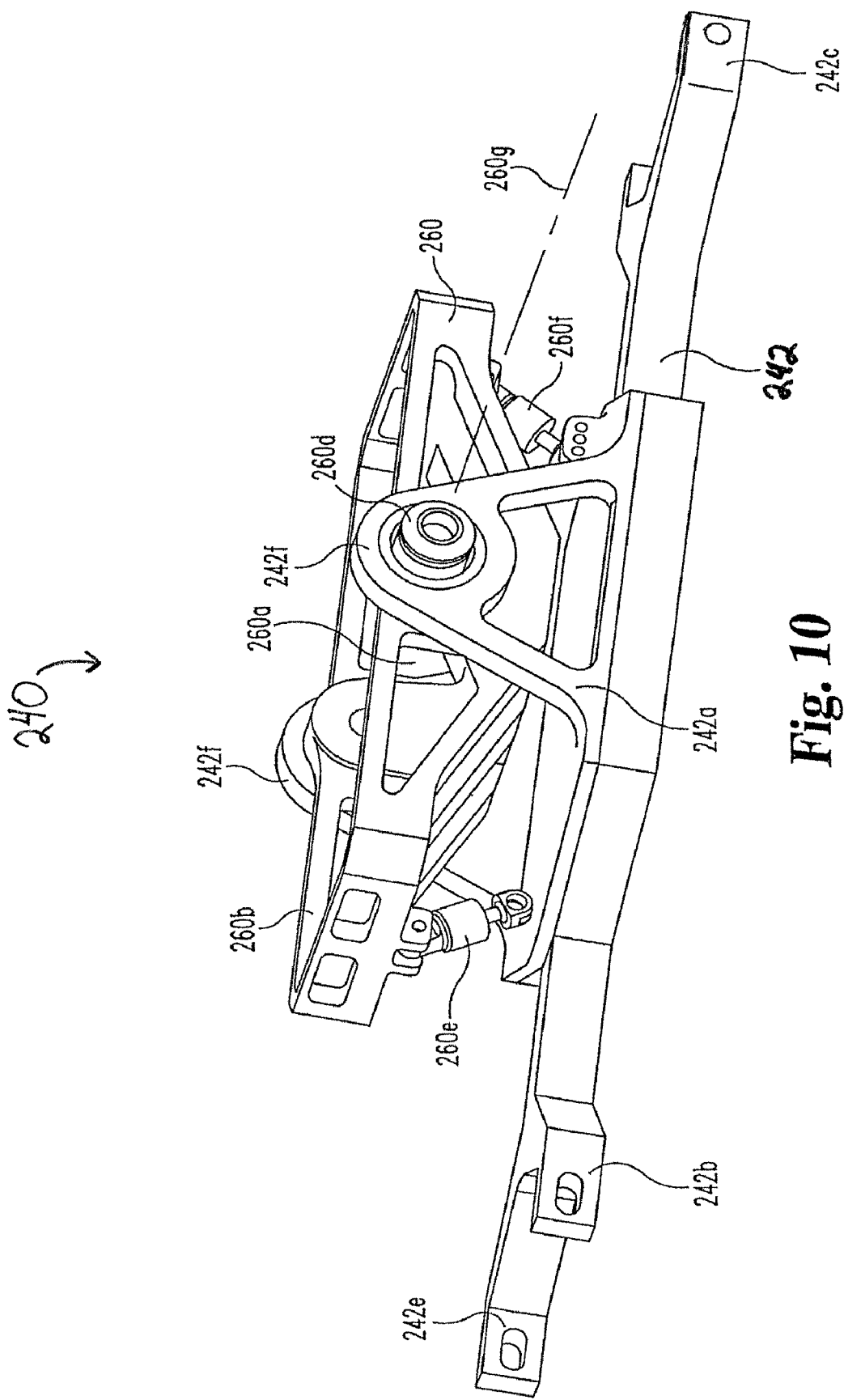
FIG. 10 is front, left side view of an apparatus according to another embodiment of the present invention.
Figure 11:
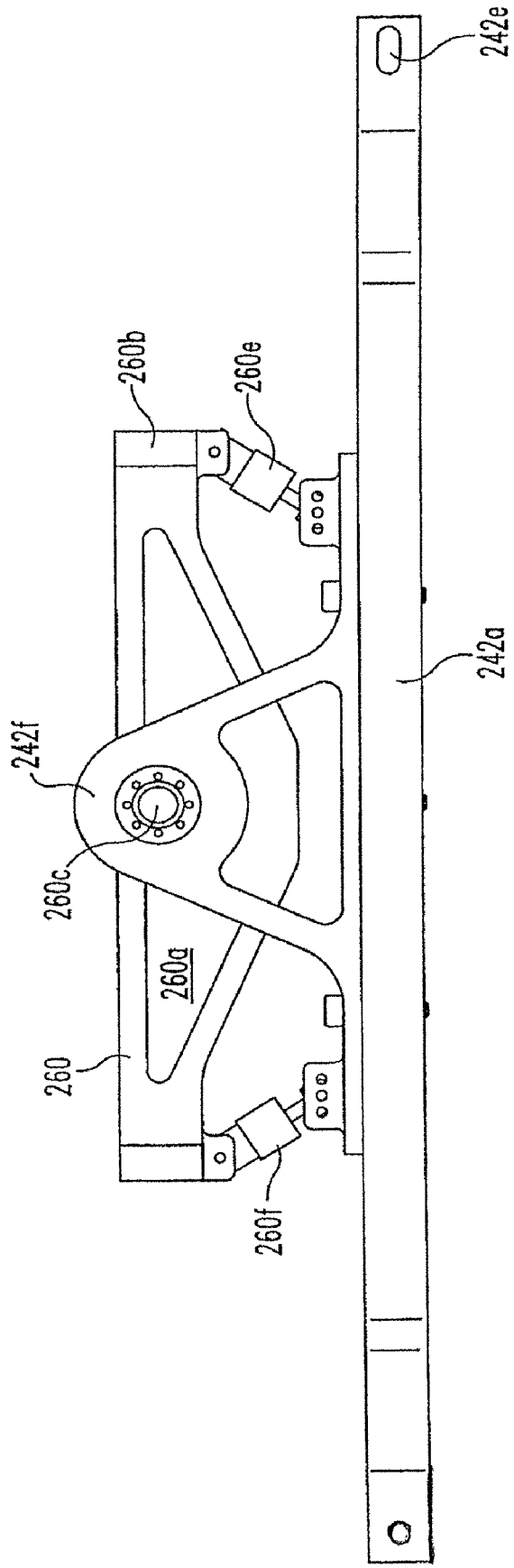
FIG. 11 is a side elevational view of the apparatus of FIG. 10.

FIGS. 10 and 11 show views of a portion of a cradling assembly 240 according to another embodiment of the present invention (and as also shown in FIG. 2). A main cradle 242 includes a payload section 242a, and front and rear yokes 242b and 242c extending therefrom. Payload section 242a includes right and left side pivot supports 242f from which a secondary cradle 260 is pivotally suspended. Cradle 260 is suspended from main cradle 242 about a pitch axis 260g which is substantially parallel to the pitch axis of the vehicle. A frame substantially surrounds the secondary payload section 260a, and further interconnects the right and left pivotal joints. Other embodiments of the present invention contemplate other arrangements for pivoting of the secondary cradle 260 relative to the main cradle 242, including those embodiments in which the pivotal couplings are placed fore and aft of secondary cradle 260 and permit rolling motion of the secondary cradle relative to the main cradle. In yet other embodiments, secondary cradle 260 is attached by a single Z-axis oriented pivot joint to the main cradle which permits yawing motion of the secondary cradle relative to the main cradle.

Still referring to FIGS. 10 and 11, secondary cradle 260 is also pivotally coupled to main cradle 242 by one or more pitch dampers. As best seen in FIG. 1, the forward end of frame 260b is pivotally coupled to one end of a front pitch damper 260e, the other end of the damper being pivotally connected to payload section 242a (this second connection being shown with an optional, multiple attachment hole bracket). A rear pitch damper 260f is likewise attached pivotally at each end to secondary cradle frame 260b and payload section 242a. As best seen in FIGS. 10 and 2, front and rear secondary cradle pitch dampers 260f and 260e are preferably located along the longitudinal axis of the vehicle, although the present invention is not constrained to this mounting. Further, each damper 260f and 260e is also angled relative to a vertical axis as best seen in FIG. 11.

The present invention contemplates those embodiments in which either or both of the secondary cradle pitch dampers utilize a conventional dampening fluid, and also those embodiments in which either or both of the secondary cradle pitch dampers employ a magnetorheological fluid. In the latter case, the MR damper is operably connected to an electronic controller which controls the properties of the fluid according to an algorithm which lowers the peak G-load experienced by the payload 236a.

FIG. 12 is a schematic representation of the interconnection of various components of vehicle 20 to each other and also to an electronic controller 80. This figure shows a series of rigid bodies interconnected schematically by the components and assemblies previously described. Each rigid body has at least one degree of freedom relative to the adjacent, interconnected rigid bodies. Further, FIG. 12 includes a schematic representation of various sensors and actuators interconnected to an electronic controller.

Fundamentally, the first rigid body (wheel 25) is interconnected to the terrain T by a resilient tire 24. Wheel 24 can move relative to a specific point of contact on the terrain along several degrees of freedom: vertically (sidewall deflection when encountering a bump B); longitudinally (such as one encountering a wall W); and roll (due to flexing of the tire sidewall when transmitting torque). Rigid body movement of the wheel in pitch, yaw, and lateral directions may also be present.

The wheel (the first rigid body) is interconnected to frame 31 (a second rigid body) as represented by arrow A. Arrow A represents the linkages such as the upper and lower control arms 26 and spring/damper units 28 as best seen in FIG. 2. This second rigid body (frame 31) is able to move relative to the first rigid body in the roll, pitch, yaw, longitudinal, lateral, and vertical directions, with significantly different amounts of travel among these directions. In some embodiments, frame angular movement in roll and pitch may be significantly greater than angular movement in yaw. As another example, body 22 and frame 31 may move significantly more in the vertical direction than in the longitudinal or lateral directions relative to the wheels.

This second rigid body (frame 31) is interconnected as represented by arrow B to a third rigid body (main cradle 242) by the front and rear central pivot joints 46a and 46c, centering springs 48, and cradle dampers 52. Main cradle 242 can move relative to frame 31 in the longitudinal direction (both as a link in a 4-bar parallelogram linkage and also as a result of longitudinal free play of slot 242e); in the vertical direction (acting uniformly against both front and rear centering springs); in roll (rolling about the front and rear ball and socket joints), and in pitch (accompanied by differential movement of the front and rear centering springs).

In some embodiments, the third rigid body (main cradle 242) is further interconnected to a secondary cradle 260 as indicated by arrow C. The interconnection represented by arrow C includes the pivotal attachments 260c and 260d and the front and rear pitch dampers 260e and 260f. A payload 236a is shown rigidly connected to secondary cradle 260, but as has been previously described, the payload may alternatively be connected to main cradle 242. Secondary cradle 260 can move in the pitch direction relative to main cradle 242.

FIG. 12 also shows an electronic controller 80 such as a computer which is operably connected to various sensors and actuators. In one embodiment, computer 80 receives input from a plurality of accelerometers 82 that are located on frame 31. These accelerometers can be oriented to provide information about acceleration in all six degrees of freedom, or only in those degrees of freedom previously discussed for frame 31. In addition, controller 80 receives acceleration data from one or more cradle accelerometers 86 attached to main cradle 242. Accelerometers 86 may include sensors for all six degrees of freedom, or only for those degrees of freedom previously discussed for cradle 242. Further, the present invention contemplates those embodiments in which accelerometers can be located within the confines of the housing of the controller 80, thus sensing acceleration of whatever the controller is mounted to.

In one embodiment of the present invention, cradle dampers 52 use an MR fluid. These dampers are operably coupled to computer 80, which includes an actuator output for applying a voltage to the dampers such that the electrified MR fluid changes its properties. This actuator input from computer 80 to dampers 52 is shown schematically by an arrow and dashed line into arrow B. In some embodiments, cradle dampers 52, whether utilizing an MR fluid or other fluid, have incorporated into them a load sensor (such as a load cell, strain gauge, or pressure transducer, as examples) in order to calculate the force being applied by the actuator.

Arrow C is representative of the interface between cradles 242 and 260 includes at least one secondary cradle damper 260e, with some embodiments having multiple secondary cradle dampers. These dampers 260e and 260f utilize MR fluid in some embodiments and conventional hydraulic fluid in other embodiments. For those embodiments utilizing the MR fluid, the dampers 260 are adapted and configured to impose the voltage applied by the corresponding actuators of computer 80 onto the MR fluid so as to change its fluid properties. In some embodiments, dampers 260e and 260f also employ a sensor for measuring the force applied by the damper for use in calculation performed by computer controller 80.

For those embodiments of the present invention utilizing cradle dampers that use conventional hydraulic fluid, dampers 52 respond primarily to differences between the relative velocities of frame 31 and cradle 242. A sudden G input to frame 31 (such as when body 22 runs into a wall), is not transmitted immediately into cradle 242, since the relative velocity of frame 31 to cradle 242 (which prescribes the force of the dampers) lags behind the relative acceleration of frame 31 relative to main cradle 242. Thus, the harsh effects of an impact to vehicle 20 are softened by the damped suspension represented by arrow B.

In those embodiments of the present invention in which one or more of the cradle dampers (52 or 260) utilize an MR fluid, computer 80 can change the damping characteristics of the particular damper, based on a measurement of the load applied by that damper, and further based on a controlling algorithm which describes the desired relationship of frame acceleration to payload (i.e. cradle acceleration). The present invention also contemplates those embodiments in which some dampers utilize an MR fluid, and other dampers do not.

In those embodiments having an internal enclosure or shell for a person, the damping characteristics can be controlled to orient the suspended enclosure in a manner which increases the person's awareness of the vehicle environment. As one example, the damping characteristics can be controlled to offer haptic feedback from the vehicle environment to the person. As another example, the damping characteristics can be adjusted to minimize the deviation of the roll angle of the shell from the horizontal, so as to maintain the person's head and inner ear relatively level. Such roll stabilization can help the person maintain eye or weapon contact with a target. This stabilization can also increase the comfort of and reduce motion induced injuries to a wounded person being transported to medical care.

One embodiment of the present invention pertains to a vehicle having a plurality of wheels in contact with a surface, and a frame suspended from the wheels. This embodiment of the invention includes a platform which is suspended on opposite sides by pivotal joints. Each pivotal joint permits rotation about two orthogonal axes. The platform includes a mounting surface located below the pivotal joints. In a different embodiment, the two joints are laterally spaced apart and coupled to the frame. In yet other embodiments each of the two joints are suspended vertically between top and bottom springs. In yet other embodiments at least one of the top springs is preloaded.

In yet another embodiment of the present invention, there is a vehicle with wheels for traversing over a surface. The vehicle includes a frame which is suspended from the wheels by a plurality of springs or shock absorbers. A cradle is pivotally supported by the frame with at least two pivotal attachments. Each pivotal attachment permits rotation about each of three orthogonal axes.

In yet another embodiment of the present invention there is a vehicle with a plurality of wheels, each of the wheels being pivotally coupled to a frame of the vehicle. The vehicle includes a plurality of shock absorbers, each shock absorber being pivotally coupled at one end to the frame and pivotally coupled at the other end to either a wheel or a suspension component. The vehicle includes first and second attachment arms, each attachment arm being pivotally coupled to the frame by a joint that permits rotation about a corresponding axis. The vehicle further includes a cradle that is pivotally coupled at the first end to the first arm, and pivotally coupled at the second end to the second arm. Each of the joints connecting the cradle to the arms permits rotation about a corresponding axis. Each of the four axes thus described are parallel to each other.

In another embodiment of the present invention there is a vehicle having a frame and a plurality of wheels, each of the wheels being pivotally coupled to the frame and biased apart from the frame by a corresponding biasing unit such as a spring. The vehicle also includes a cradle that is pivotally attached to the frame at two attachments. Each attachment permits rotation in the roll and pitch directions. The cradle is adapted and configured to support a payload such that the center of gravity of the payload is below the roll and pitch axes of the first attachment and below the roll and pitch axes of the second attachment.

Yet another embodiment of the present invention pertains to a vehicle having a frame and wheels, the frame being pivotally coupled to the wheels, each wheel being biased away from the wheel by a spring or shock absorber. A cradle is pivotally coupled to the frame by at least two pivot joints that are spaced apart. The vehicle further includes at least one dampening unit that is pivotally coupled at one end to the cradle and pivotally coupled at the other end to the frame. In yet another variation of this embodiment, the dampening unit operates with a magnetorheological fluid, and the vehicle includes a computer operably connected to the damper to modify the dampening characteristics based on a sensed parameter.

Yet another embodiment of the present invention pertains to a vehicle having a frame and wheels, the wheels being pivotally coupled to the frame, the frame being biased apart from each of the wheels. A cradle is pivotally coupled to the frame. The cradle and the pivotal couplings are adapted and configured to permit limited movement of the cradle to translate longitudinally, and to rotate about roll and pitch axes. In yet a variation of this embodiment there is a second cradle which is pivotally coupled to the first cradle. The second cradle, first cradle, and the pivotal attachment are adapted and configured to permit limited pitching motion of the second cradle relative to the first cradle. In either of these two embodiments there is a plurality of dampening units pivotally connected at one end to the first cradle and pivotally connected at the other end to the frame. In either of those same two embodiments there can be at least one dampening unit pivotally coupled at a first end to the first cradle and pivotally coupled at a second end to a second cradle.

While the inventions have been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus, comprising: a vehicle for transporting a payload over a surface, said vehicle having at least first and second wheels in contact with the surface, said vehicle having a frame suspended from said at least two wheels; and a cradle for supporting the payload, said cradle being pivotally supported from said frame by at least two pivot joints, each said pivot joint being adapted and configure to permit pivoting about each of two orthogonal axes, said cradle includes an attachment surface for attachment to said payload, said attachment surface being located lower than either said pivot joint.

2. The apparatus of claim 1 wherein each said pivot joint is adapted and configure to permit pivoting about the roll and pitch axes of said vehicle.

3. The apparatus of claim 1 wherein each said pivot joint is adapted and configure to permit pivoting about each of three orthogonal axes.

4. The apparatus of claim 1 which further comprises first and second biasing units, each said biasing unit having at least one of a spring or a shock absorber, said first biasing unit suspending said frame from said first wheel, said second biasing unit suspending said frame from said second wheel.

5. The apparatus of claim 4 which further comprises a third biasing units, said third biasing unit having at least one of a spring or a shock absorber, said third biasing unit suspending said cradle from said frame.

6. The apparatus of claim 1 which further comprises first and second arms for supporting said cradle from said frame, wherein said two pivot joints are first and second upper pivot joints, said first upper pivot joint supporting said first arm from said frame, said second upper pivot joint supporting said second arm from said frame.

7. The apparatus of claim 6 wherein said first pivot joint is pivotal about a first axis, said second pivot joint is pivotal about a second axis, said third pivot joint is pivotal about a third axis, said fourth pivot joint is pivotal about a fourth axis, and each of said first, second, third, and fourth axes are approximately parallel to each other.

8. The apparatus of claim 1 wherein said cradle is a first cradle, and which further comprises a second cradle pivotally coupled to said first cradle.

9. The apparatus of claim 8 which further comprises a dampening unit having two ends and pivotally coupled at one end to said first cradle and pivotally coupled at said second end to said second cradle.

10. apparatus, comprising: a vehicle for transporting a payload over a surface, said vehicle having at least first and second wheels in contact with the surface, said vehicle having a frame suspended from said at least two wheels; and a cradle for supporting the payload, said cradle being pivotally supported from said frame by at least two pivot joints, each said pivot joint being adapted and configure to permit pivoting about at least one axis, each said pivot joint includes upper and lower springs, said cradle being supported between said upper and lower springs in the vertical direction.

11. The apparatus of claim 10 wherein at least one of said top springs is preloaded.

12. The apparatus of claim 10 wherein said two pivot joints are front and rear pivot joints, and said cradle is pivotal about the oil axis of said vehicle.

13. The apparatus of claim 12 wherein said first and second wheels are front wheels rotating about a co on front axis, which further comprises third and fourth rear wheels in contact with the surface, said rear wheels rotating about a common rear axis, said frame being suspended from each of said four wheels, said front pivot joint being located aft of the front axis, said rear pivot joint being located forward of the rear axis, and said cradle being located higher than said front axis and higher than said rear axis.

14. The apparatus of claim 10 which further comprises first and second arms for coupling said cradle from said frame, wherein said two pivot joints are first and second upper pivot joints, said first upper pivot joint coupling said first arm to said frame, said second upper pivot joint coupling said second arm to said frame at least one of said first arm or said second arm being coupled to said cradle to permit translation of said cradle relative to said one arm.

* * * * *